United States Patent
Marks et al.

(10) Patent No.: US 9,245,196 B2
(45) Date of Patent: Jan. 26, 2016

(54) METHOD AND SYSTEM FOR TRACKING PEOPLE IN INDOOR ENVIRONMENTS USING A VISIBLE LIGHT CAMERA AND A LOW-FRAME-RATE INFRARED SENSOR

(71) Applicant: Mitsubishi Electric Research Laboratories, Inc., Cambridge, MA (US)

(72) Inventors: Tim Marks, Newton, MA (US); Michael J. Jones, Belmont, MA (US); Suren Kumar, Amherst, NY (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 34 days.

(21) Appl. No.: 14/274,073

(22) Filed: May 9, 2014

(65) Prior Publication Data
US 2015/0324656 A1    Nov. 12, 2015

(51) Int. Cl.
| | | |
|---|---|---|
| *G06K 9/46* | (2006.01) | |
| *G06K 9/52* | (2006.01) | |
| *H04N 5/33* | (2006.01) | |
| *H04N 7/18* | (2006.01) | |
| *G01J 5/02* | (2006.01) | |
| *G01J 5/00* | (2006.01) | |

(52) U.S. Cl.
CPC .................. *G06K 9/46* (2013.01); *G01J 5/0025* (2013.01); *G06K 9/52* (2013.01); *H04N 5/33* (2013.01); *H04N 7/18* (2013.01)

(58) Field of Classification Search
CPC ........... G01J 1/0025; G06K 9/46; G06K 9/52; H04N 5/33; H04N 7/18
See application file for complete search history.

(56) References Cited

U.S. PATENT DOCUMENTS

| | | | |
|---|---|---|---|
| 4,636,774 A | 1/1987 | Galvin et al. | |
| 5,331,825 A | 7/1994 | Kim | |
| 5,555,512 A | 9/1996 | Imai et al. | |
| 8,634,961 B2 | 1/2014 | Lee et al. | |
| 2011/0249014 A1* | 10/2011 | Kolstad et al. | 345/589 |
| 2012/0224019 A1* | 9/2012 | Samadani et al. | 348/14.01 |

OTHER PUBLICATIONS

Zhao et al., "Human Segmentation by Fusing Visible-light and Thermal Imagery," ICCV 2009 Workshop.
Davis et al., "Fusion-Based Background-Subtraction using Contour Saliency," CVPR 2005 Workshop.
Leykin and Hammoud, "Pedestrian tracking by fusion of thermal-visible surveillance videos," Machine Vision and Applications, 2008.

* cited by examiner

*Primary Examiner* — Mark R Gaworecki
(74) *Attorney, Agent, or Firm* — Dirk Brinkman; Gene Vinokur

(57) ABSTRACT

A method and system tracks objects in an environment by acquiring a first sequence of images of the environment with a visible-light camera having a first frame rate and a second sequence of images with a thermal infrared sensor having a second frame rate. The second frame rate is substantially lower than the first frame rate. The objects are tracked in the first sequence of images to obtain tracks. Warm regions in the second sequence of images are detected to obtain detections. The tracks and the detections are aligned spatially and temporally, and verified to determine whether the tracks and detections coincide after the aligning.

22 Claims, 5 Drawing Sheets

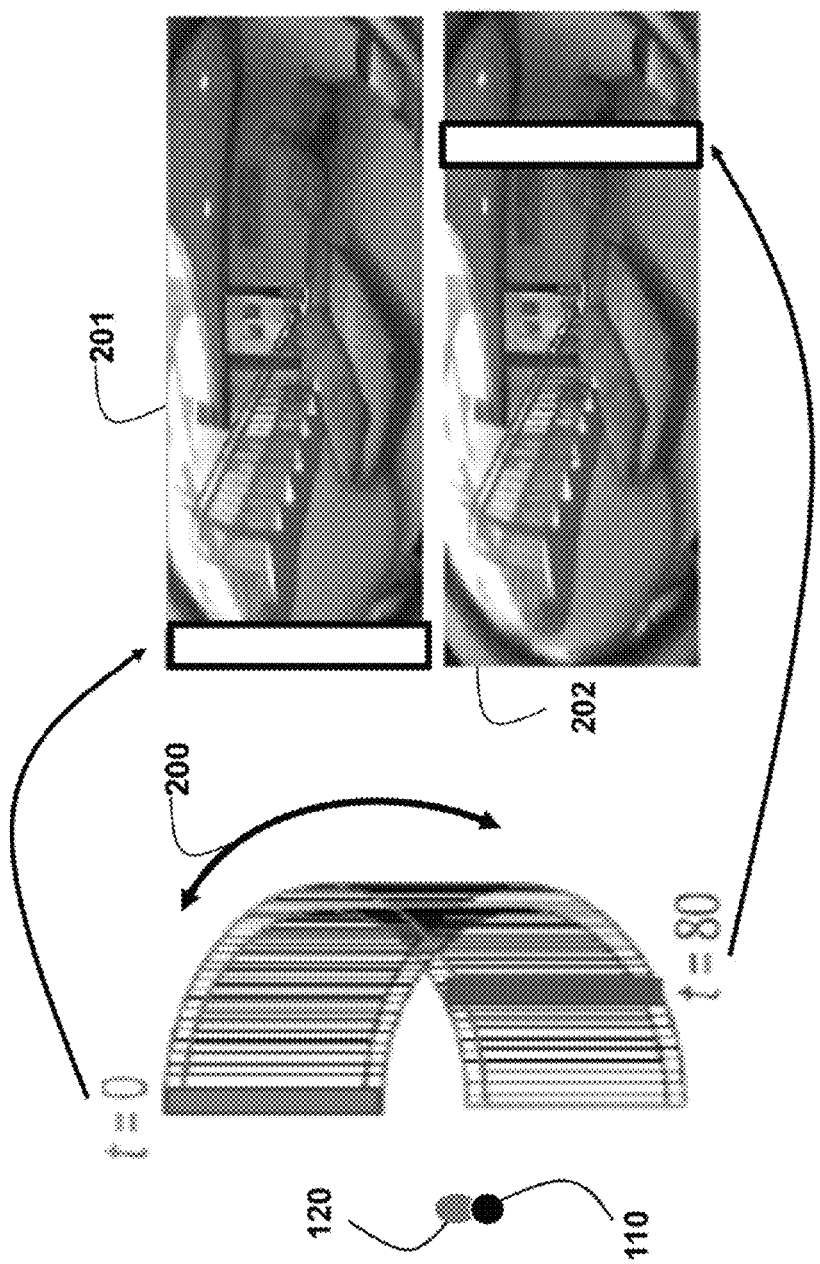

METHOD AND SYSTEM FOR TRACKING PEOPLE IN INDOOR ENVIRONMENTS USING A VISIBLE LIGHT CAMERA AND A LOW-FRAME-RATE INFRARED SENSOR

FIELD OF THE INVENTION

The field of the invention relates generally to computer vision, and more particularly to tracking people in a sequence of images online and in real-time.

BACKGROUND OF THE INVENTION

Person tracking is one of the fundamental problems in computer vision. There has been extensive work on tracking humans and other objects using visible-light video cameras, also referred to as red, green, blue (RGB) cameras. Despite much progress, human tracking remains a largely unsolved problem due to factors such as changing appearances, occlusions, motion of the camera and object, illumination variation, and background clutter. To deal with appearance ambiguities, a variety of methods exist that are based on techniques such as sparse representation, template selection and update, subspace-based tracking, and feature descriptors.

A fundamentally different approach to appearance ambiguities is based on using multiple modalities of sensing. One option for multimodal person tracking is to use a thermal infrared (IR) camera in combination with an RGB camera. However, the widespread adoption of thermal imaging has been hampered by the prohibitively high cost of thermal infrared cameras. Herein, we use the term infrared and the abbreviation IR to refer solely to thermal infrared signals, and not to near-infrared (NIR) signals. We use the term RGB camera to refer to a video camera that operates in the visible range of the electromagnetic spectrum. We use the term RGB camera to encompass not only color cameras but also monochrome or grayscale cameras.

Information fusion across different modalities can be performed at various levels. For example, a low-level fusion approach can combine RGB and IR information at the pixel level, before features are determined. However, if there is a large difference between the spatial and temporal resolutions of the RGB camera and the IR sensor, then fusing low-level information is precluded. In a high-level fusion approach, a global decision might be reached after applying completely independent tracking in the two modalities.

We now describe prior-art approaches to tracking using three types of setups: an RGB camera alone (RGB camera-only tracking), an IR sensor alone, or a combination of both the IR sensor and the RGB camera (RGB+IR).

RGB Camera-Only Tracking

We now describe three basic approaches to RGB camera-only tracking. In the first approach, known as visual tracking, a single object to be tracked is manually marked in the first image of a video sequence. Then, the appearance of the object and background in the first image, along with the subsequent video images, is used to track the object over the course of the sequence. However, visual tracking methods do not include automatic initialization of tracks, which is a problem for many real-world applications. Furthermore, visual tracking methods typically track only one object at a time, and tend to drift off of the target object over long sequences.

A second approach for RGB camera-only tracking, the "tracking-by-detection" approach, provides a more complete solution for multi-person tracking. Tracking-by-detection methods rely on a person detector to detect people in images, then use appearance and other cues to combine these detections into tracks. Such methods often use a relatively slow (not real-time) person detector and combine tracks in an offline process.

An alternative paradigm for RGB camera-only tracking integrates detection and tracking more tightly with an online procedure. Examples of this third paradigm include the "detect-and-track" approach, which uses a background model to detect candidate objects for tracking and couples detection and tracking in a feedback loop.

IR-Only Tracking

Thermal IR imaging offers advantages in differentiating people from background by virtue of temperature differences. The simplest approach, which is widely adopted, uses intensity thresholding and shape analysis to detect and track people. Features traditionally used in RGB images, such as histograms of oriented gradients (HoG), and other invariant features, have been adapted to IR images for person detection. Background modeling in infrared can be combined with grouping analysis to perform long-term occupancy analysis.

Tracking Using RGB+IR

Prior art approaches differ in the level at which information from the IR and RGB streams are combined. Leykin and Hammoud, "Pedestrian tracking by fusion of thermal-visible surveillance videos," Machine Vision and Applications, 2008 describe a system that combines RGB and IR information at a low level. Their system tracks pedestrians using input from RGB and thermal IR cameras to build a combined background model.

In contrast, the system of Davis et al., "Fusion-Based Background-Subtraction using Contour Saliency," CVPR Workshop 2005, merges RGB and IR information at mid-level. Their system uses thermal and visible imagery for persistent object detection in urban settings. Statistical background subtraction in the thermal domain is used to identify an initial regions-of-interest (ROI). Color and intensity information are used within these areas to obtain the corresponding regions-of-interest in the visible domain. Within each region, input and background gradient information are combined to form a contour saliency map.

In yet another approach, Zhao et al., "Human Segmentation by Fusing Visible-light and Thermal Imagery," ICCV Workshop 2009, first tracks blobs independently in the output of the IR camera and the output of the RGB camera, and then merges the information at a high level to obtain a combined tracker.

In each of these prior art approaches to tracking using RGB and IR cameras, the IR camera has about the same fast frame rate as the RGB camera.

U.S. Pat. No. 4,636,774 uses a motion sensor to turn lights ON and OFF. However, that method cannot distinguish motion of people from other motions in the room, nor can it determine the number of people in a room.

U.S. Pat. No. 8,634,961 uses a visible light camera mounted on a fan to detect people and accordingly turn the fan ON and OFF.

U.S. Pat. No. 5,331,825 uses an infrared camera to detect people in a room and accordingly control an air conditioning system.

SUMMARY OF THE INVENTION

The embodiments of the invention provide a method for detecting and tracking people in an indoor environment, mainly for the purpose of improving a control of equipment, e.g., a heating ventilation and air-conditioner (HVAC) system. The method uses images acquired by a low-frame-rate infrared (IR) sensor and a relatively high-frame-rate visible-light (RGB) video camera. The frame rate of the infrared sensor can be much slower (e.g., 1800 times, or three orders of magnitude, slower) than the frame rate of the visible light camera, e.g., 1 frame per minute vs. 30 frames per second.

The visible-light images are used to track objects, e.g., people, using a background model. The infrared images are used to detect warm regions. For example, the normal ambient temperature for an indoor environment typically is in a range of 20° to 25° Celsius. Thus, warm regions would have temperatures greater than a threshold value such as 25° Celsius.

The object tracks and warm region detections are spatio-temporally aligned. This alignment makes it possible to verify coincidence of the tracks and detections, which enables eliminating false positive tracks, improving the boundaries of static tracks, and, in certain situations, generating new tracks and updating the model so that false negatives can be eliminated.

The embodiments describe a person tracking framework using a scanning low-cost, low-resolution thermal infrared (IR) sensor colocated with an RGB camera. Because of the low temporal and spatial resolution, the IR sensor is unable to track moving people, and prone to detecting warm regions other than people. Thus, IR-only tracking using only the IR sensor is problematic.

However, despite the limited capabilities of the IR sensor, the IR sensor can be used effectively to correct errors of a real-time RGB camera-based tracker. The signals from the camera and the IR sensors are aligned spatially by determining a pixel-to-pixel geometric correspondence between the two modalities. The signals are aligned temporally by modeling temporal dynamics of the scanning IR sensor. This spatial and temporal alignment enables multi-modal improvements to tracking based on a judicious application of elementary reasoning.

The combined RGB+IR system improves upon the RGB camera-only tracking by: rejecting false positives, improving segmentation of tracked objects, and correcting false negatives by starting new tracks for people that were missed by the camera-only tracker. Because RGB and thermal information are combined at the level of RGB camera-based tracks, the method is not limited to a particular camera-based tracker. The method can improve the results of any tracker that uses RGB camera input alone.

The embodiments are based on the realization that even a very low-cost thermal sensor can significantly improve person tracking when used in conjunction with a low-cost RGB video camera. In one embodiment, the thermal sensor includes an array of 32 thermal IR receivers arranged in a vertical line, which is partially rotated back and forth by a motor in 94 discrete steps to produce a 140° (wide) field-of-view IR image over a time duration of one minute. Hence, our sensor produces a 32×94 pixel infrared image at a rate of one frame per minute.

Using expensive IR cameras, tracking can be done using only thermal IR imagery. However, the embodiments consider what can be done with a very low-cost thermal infrared sensor, whose low resolution and extremely low frame rate preclude the possibility of tracking using IR information alone.

The system combines real-time tracking using an RGB camera with information from the IR sensor, to capitalize on the advantages of both modalities while minimizing their disadvantages. The RGB tracker combines background modeling with template tracking. The RGB tracker is excellent at detecting moving people. Due to its extremely low frame rate, the IR sensor is not useful for detecting or tracking people when they are moving about the room, and due to its low spatial resolution, the IR sensor cannot easily distinguish stationary people from other stationary warm objects. However, the IR sensor is extremely reliable in that the sensor always registers stationary people as heat sources.

By judiciously combining the low-frequency information from the thermal IR sensor with the high-level tracks from the RGB tracker, the system improves upon the RGB camera-only tracker in many situations, eliminating a variety of false positives and false negatives, and improving the region boundaries of true detections.

The focus of the embodiments is on tracking people in indoor scenes, in which, in addition to the people, there can be many warm inanimate objects such as computers, monitors and TV screens, hot drinks, and room heaters. Given the low spatial, temporal, and thermal resolution of the IR sensor, as well as variation in the temperature profile of a person due to clothing, simply background subtraction in IR images cannot be used to determine the locations of people.

BRIEF DESCRIPTION OF THE DRAWINGS

FIG. 2A is a schematic of a thermal sensor that includes an array of thermal IR receivers arranged in a vertical line rotated by a motor according to embodiments of the invention;

FIG. 2B are RGB images acquired at two time instances according to embodiments of the invention.

DETAILED DESCRIPTION OF THE EMBODIMENTS

Figure 1A:
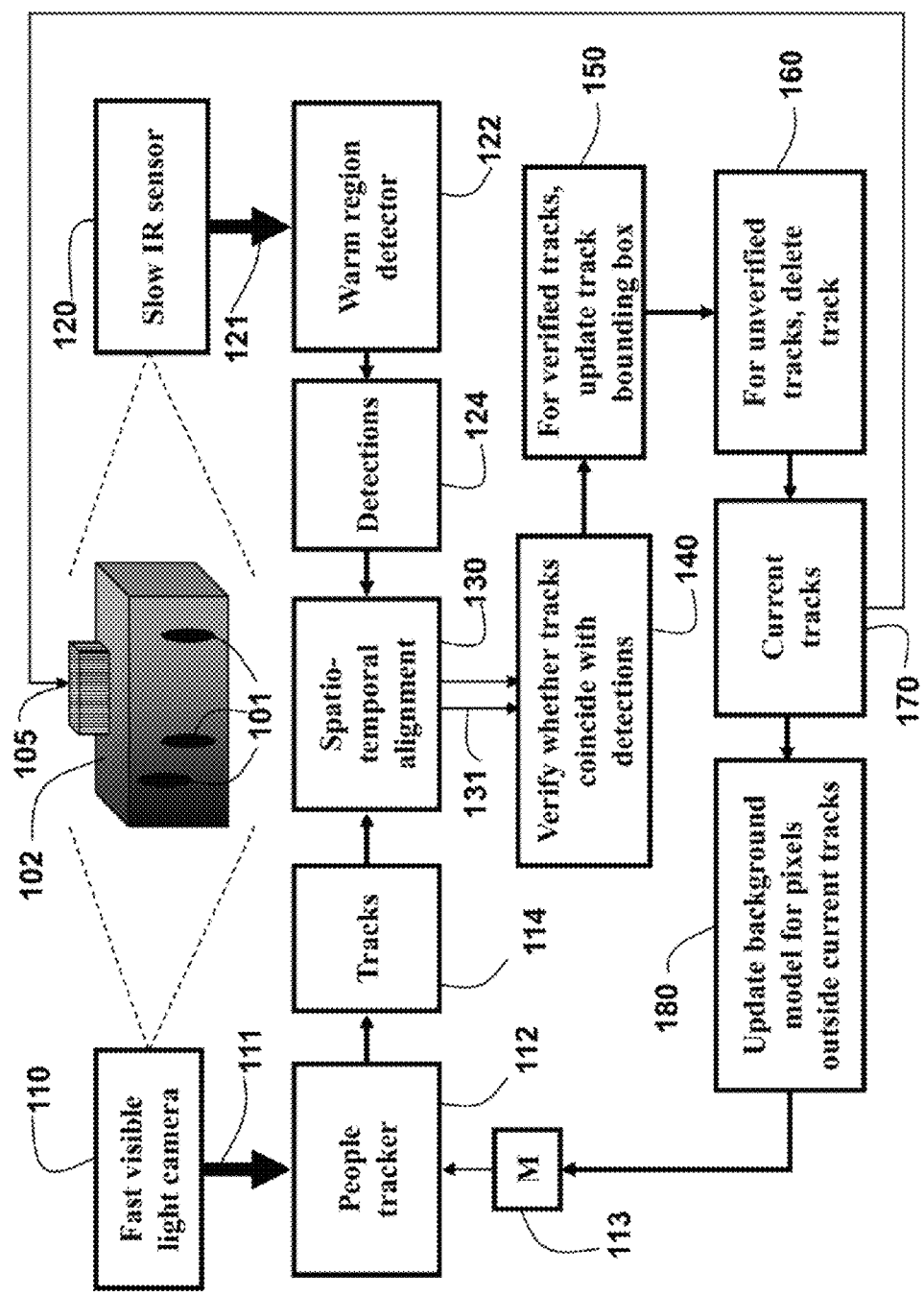
FIG. 1A is a flow diagram of a method for tracking people according to embodiments of the invention.

FIG. 1A shows a method and system for detecting and tracking people 101 in an environment 102 according to embodiments of our invention. A first sequence of images 111 of the environment is acquired by a visible-light (RGB) camera 110 having a first frame rate. A second sequence of images 121 of the environment is acquired by an infrared (IR) sensor 120 having a second frame rate. The second frame rate is substantially lower than the first frame rate. In some embodiments, the resolution of images from the IR sensor is much lower than the resolution of images from the RGB camera. In one embodiment, the thermal sensor includes an array of 32 thermal IR receivers arranged in a vertical line, which is partially rotated back and forth 200 by a motor in 94 discrete steps to produce a 140° field-of-view IR image over a time duration of one minute, see FIG. 2A. The RGB camera and the IR sensor are substantially colocated.

Objects, e.g., people, are tracked 112 in the first sequence of images using a background model (M) 113 to obtain (people) tracks 114. Warm regions are detected 122 in the second sequence of images to obtain (thermal) detections 124. The tracks and detections are spatio-temporally aligned to obtain aligned tracks and detections 131.

Then, it is verified 140 whether the aligned tracks and detections coincide. Tracks that are verified have their bounding boxes updated 150 to equal the corresponding detection bounding box. Tracks that are not verified are deleted 160.

This results in a new current set of tracks 170. The background model is then updated 180 for every pixel lying outside a current track. This yields a new background model 113.

The steps of the method can be performed in a processor connected to memory and input/output interfaces by buses as known in the art.

The track can be used to control equipment in the environment, e.g., a heating ventilation, air conditioning (HVAC) system 105.

As an advantage, the system according to the embodiments uses an inexpensive video camera and an inexpensive low-frame-rate infrared sensor, while still obtaining accurate results. The frame rate of the infrared camera is substantially slower than the frame rate of the visible light camera. The infrared sensor acquires one vertical scan line at a time. The scan line corresponds to a small number of columns of pixels in the image acquired by the camera at a corresponding time.

The alignment uses a combination of nonlinear mappings and a linear homography mapping. The mappings can be obtained during a one-time calibration phase described below. The temporal correspondence is determined using the video camera and thermal sensor time stamps, and knowledge of the speed and resolution of each sensor.

Given the spatial and temporal correspondence between the two sensors, the people track from the video camera can be verified by checking for a warm region in the thermal image at a location and time that overlaps with the location and time of a people track. Given a sufficient overlap between a track from the video camera and a warm region from the thermal sensor, the size and the position of the track are adjusted to tightly fit around the warm region from the thermal sensor using a bounding box. This improves the accuracy of the track to fit tightly around a tracked person in the scene.

Figure 1B:
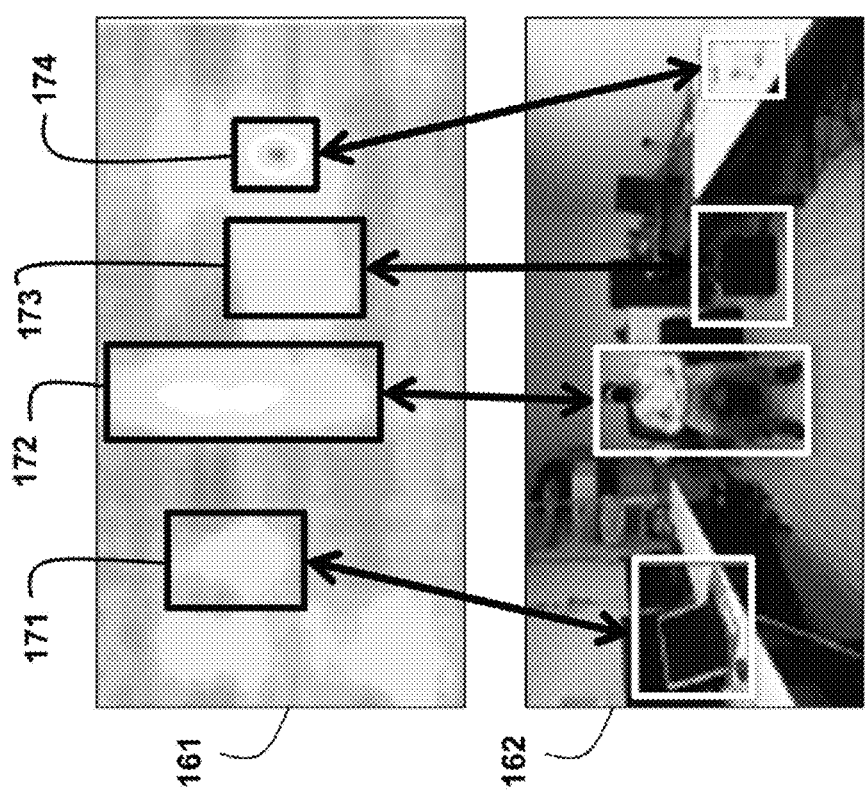
FIG. 1B shows a thermal IR image, a corresponding visible-light (RGB) image, bounding boxes of warm regions in the IR image, and corresponding regions in the RGB image.

FIG. 1B shows a thermal image 161 and a corresponding visible-light image 162. The four warm regions 171-174 in the thermal image correspond to a laptop computer, a person, a personal computer box, and a hot drink cup, respectively, as indicated in the visible-light image. The warm regions would have temperatures greater than some threshold, e.g., 25° Celsius.

Spatio-Temporal Alignment

Prior art work in RGB+IR tracking uses setups in which a relatively expensive IR camera has a frame rate that is comparable to, or identical to, the frame rate of the RGB camera. Thus, prior art work in this area considers only spatial alignment and does not consider temporal alignment, other than perhaps a simple matching of RGB frames to corresponding JR frames.

In our setup as shown in FIGS. 2A and 2B, the very low-cost IR sensor is about 1800 times slower than the RGB camera. Thus, temporal alignment of the signals (images) from the camera and IR sensors is required. Furthermore, our IR sensor scans very slowly from side to side, acquiring a single column of the IR image in the same amount of time that the camera acquires multiple images. As a result, our temporal alignment actually aligns every individual column of each IR image, as shown in FIG. 2A, with corresponding columns of multiple RGB images as shown in FIG. 2B.

For example, during one minute, the IR sensor makes a full pass from left to right, collecting 94 columns of an IR image. Two of the columns (t=0 and t=80) are highlighted. Corresponding RGB images acquired at t=0 (201) and at t=80 (202) are shown. The IR information acquired at time t=0 (the leftmost column of the IR image) corresponds to the vertical stripe of the top RGB image that is highlighted. The IR information acquired at t=80 corresponds to the vertical stripe of the bottom RGB image that is highlighted.

Spatial Alignment

We spatially align the images acquired by the RGB camera and the IR sensor. In most of the previous work on RGB+IR tracking, the outputs of the RGB and IR cameras are well approximated by a linear camera model, so spatial alignment can be performed using a homography (a 3×3 linear projective transformation) between the two images.

In our setup, both the RGB camera and IR sensor are wide-angle sensors with significant radial distortion. For this reason, a simple homography does not suffice for registering images from the camera and sensor. To minimize alignment problems due to depth disparities, we approximately colocate the RGB camera 110 and IR sensor 120. That is, the two sensors are placed as close together as physically possible, see FIG. 2A.

Figure 3:
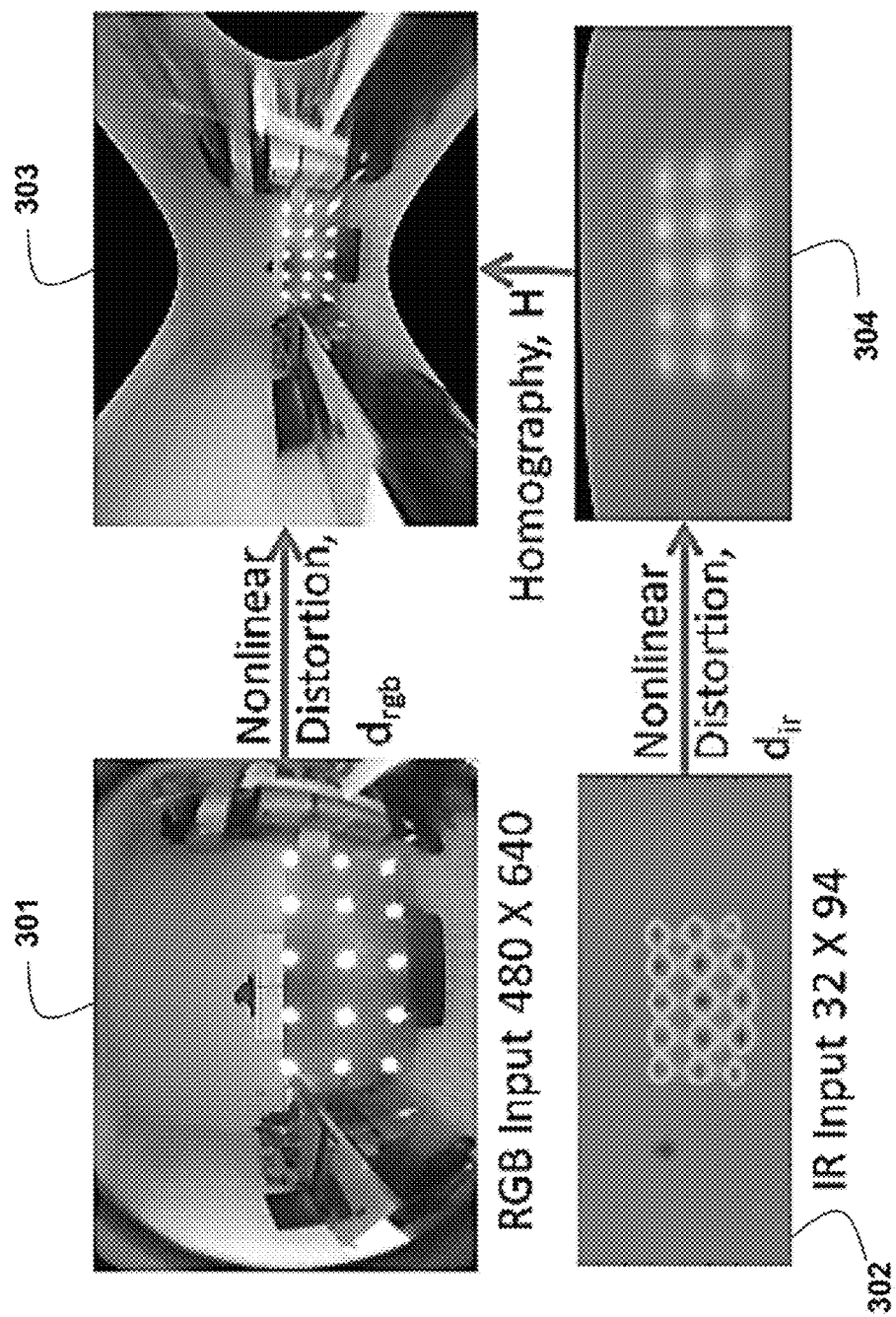
FIG. 3 is a schematic of a calibration procedure used by embodiments of the invention.

As shown in FIG. 3, a calibration board for use in images 301-302 from the RGB camera and the IR sensor, respectively, includes a 5×3 grid of incandescent lights. Since they heat up when they are ON, they are easily visible even to our low-cost, low-resolution thermal sensor. The centers of the lights are found automatically in both the RGB and IR images by a procedure for finding high-intensity (bright or warm) regions constrained by the known spatial arrangement of the lights.

Using the 15 corresponding points in images of the calibration board, we first calibrate the RGB camera and IR sensor individually and estimate their radial and tangential distortion parameters. This yields nonlinear mappings, $d_{rgb}$ and $d_{ir}$, that map a pixel of the raw RGB or IR image into a pixel in the corresponding undistorted image.

Next, we warp the images using the estimated distortion parameters to create IR images 303 and RGB images 304 that are undistorted, where each undistorted image obeys a linear camera model. The 15 correspondences between the undistorted RGB and IR images are then used to learn a homography matrix H. Since the RGB camera and IR sensor are approximately collocated, H represents an infinite homography, which we determine using Direct Linear Transformation (DLT) with isotropic scaling.

We represent the forward mapping from IR image to RGB image as F such that $x_{rgb} = d_{rgb}^{-1}(H d_{ir}(x_{ir})) = F(x_{ir})$, where $x_{rgb}$ is the location of a pixel in the RGB image corresponding to pixel location $x_{ir}$ in the IR image.

Temporal Alignment

There has been very limited work on temporal alignment of data from IR and RGB imaging modalities, probably because in previous work the sensors used in different modalities typically have similar frame rates. One method uses generator locking to allow two camera frame clocks to be synchronized. However, such hardware methods cannot be applied to our system because of the very low frame rate of our IR sensor. Our infrared sensor uses a single column of 32 IR sensors that scan the scene in discrete steps moving from left to right to get one 140° field-of-view image, followed by a right-to-left scan to get a second 140° field-of-view image.

Rather than sending each column of the IR image as it is sensed, our interface to the sensor requires waiting until the end of an entire minute-long scan (a full IR image), at which time the entire IR image is transmitted. We model the dynamic motion of the IR camera with a uniform velocity profile and use timestamps of the IR and RGB images, along with the spatial alignment, described above, to map each column of each RGB image to a corresponding vertical stripe of the corresponding RGB images. It is understood that our method can also be used with an IR sensor that sends each column of the IR image separately after it is sensed.

Accurate spatio-temporal correspondence between the RGB camera and IR sensor is necessary to our approach. For example, suppose a person walks into the scene and sits down, represented by the RGB tracker as a static track. When the next IR image arrives, the system verifies every static RGB track using the corresponding region in the IR image. If it corresponds to a warm region in IR, then it is in fact a stationary person, otherwise it is a false positive. When the IR image arrives, our system should only perform this verification if the IR sensor scanned the static track's location after the track arrived at that location. This type of reasoning requires precise spatio-temporal correspondence.

RGB Tracker

Our system integrates high-level information from an RGB camera-based tracker with mid-level information (regions) from the IR stream. Because the information from the RGB tracker is integrated at a high level (the track level), the details of the particular RGB tracker that we use are not that important. Our method for RGB+IR fusion is not restricted to the particular RGB tracker that we use. The method can work with a variety of real-time, online RGB trackers. Thus, we do not give an exhaustive description of the particular RGB tracker that we use.

However, in order to give a basic understanding of our RGB tracker, we briefly describe it here. Our RGB tracker is derived from a stand-alone real-time tracking system intended for use on long video sequences of indoor living spaces. Such environments pose particular challenges that are not present in standard datasets for tracking and for person detection. These challenges include people in unusual poses, such as sitting down or lying on a couch, people who are stationary for a long period of time, e.g., watching TV or sleeping, people viewed from unusual perspectives, e.g., from a wide-angle camera high up in the back of a room, and lighting that is inadequate and/or changes quickly.

Such video sequences cause many conventional trackers and person detectors to fail. In experiments on long video sequences acquired in living environments, we have found that our RGB tracker outperforms many prior-art tracking systems.

We use a Gaussian-per-pixel background model to detect foreground objects in the RGB image. Detected foreground objects are tracked using a template tracker. The background model is updated with every new image, but only for pixels that are not within person tracks. Foreground detections are associated with template tracks based on the amount of overlap. Any foreground detections that do not overlap with an existing track are treated as new detections. We use a set of visual cues to distinguish people, which are the foreground objects that we want to track, from other foreground objects, such as new objects brought into the room, moved furniture, etc., that we do not want to track. The main visual cue is motion. If an object initially moves around the room (as opposed to not moving or moving in place such as a fan or fluttering curtain), then it is assumed to be a person.

All foreground objects that are classified as people have an associated identity descriptor, such as a color histogram. Matches to previous identity descriptors are another visual cue. If a newly detected foreground object is not moving, then it must match a stored identity descriptor in order to be classified as a person and to continue being tracked. This visual cue handles the case in which a person walks into the room, stops moving, and remains stationary while the person is occluded and then unoccluded by another person passing in front. Right after the person is unoccluded by the person passing in front, the stationary person is newly detected as foreground because the person does not match the background model. Because the track is not moving around the room, it is required to match a stored identity descriptor in order to be classified as person. In contrast, newly detected static foreground objects that do not match a stored identity descriptor are classified as non-people and are not tracked.

These are the main visual cues that our tracker uses, although there are a few others that are of lesser importance. Using these visual cues, our RGB tracker is able to reliably track people in indoor environments. Furthermore, using these cues helps to make our system more accurate, and much more computationally efficient, than a conventional person detector.

Incorporating IR to Improve RGB Tracking

Although our RGB tracker works well in most cases, there are cases in which it tracks a non-person object (false positive), and cases in which the bounding box for the track does not fit tightly around the person. Also, in certain cases our tracker may fail to track a person, which is known as a false negative. For each of these failure modes, information from the low-cost IR sensor can be used to correct the problem.

In one embodiment, the IR camera has a resolution of 32×94 pixels and generates 1 image per minute. The RGB camera has a resolution of 480×640 and runs at, e.g., 10 frames per second. With the arrival of each new IR image (e.g., once per minute), the IR information is incorporated into the tracking. It should be understood that other frame rates and other resolutions can be used. But it should be noted that the frame rate of the IR sensor (e.g., 1 frame per minute) is much lower than the frame rate of the RGB camera (e.g., several frames per second).

In general, our system tracks in real-time using the RGB camera. When a new IR image becomes available (e.g., once per minute), we use warm regions detected in the IR image to verify and improve the boundaries of static tracks and, in certain situations, to generate new tracks. Because the IR sensor has such a low frame rate, it can only be applied to static tracks. The IR images cannot be used to verify or improve tracks of moving objects, because these either are not acquired by the relatively slow IR sensor, or produce severe temporal aliasing in the IR images.

Let tr represent a particular track, and let $$bb_{tr}(i) = [x_{tr}(i) y_{tr}(i) w_{tr}(i) h_{tr}(i)]^T, \quad (1)$$

represent the bounding box for track tr in image i, where (x,y), w, and h respectively represent the bounding box's center, width, and height. We define the motion of a track tr over the last p images from the RGB camera as $$\text{motion}(tr) = \frac{1}{p} \sum_{i=f-p}^{f-1} \|bb_{tr}(i) - bb_{tr}(i+1)\|_1, \quad (2)$$

where $\|\cdot\|_1$ denotes the $L_1$ norm, and f is the index of the current frame (image) from the RGB camera. (In our experiments, we set p to half of the ratio of the frame rates of the RGB camera and the IR sensor.) Every track whose motion is less than a threshold is classified as a static track.

Non-Person Track Rejection

Background-model-based tracking methods occasionally have false positives resulting from motion of non-person objects, such as an empty office chair that rolled in before coming to a halt. Once a previously-moving object has become stationary, the stationary track for that object is verified using the next IR image that arrives from the sensor. When the next IR image arrives, the RGB+IR system rejects that track as a non-person object (false positive) because there is no corresponding warm IR region.

Figure 4:
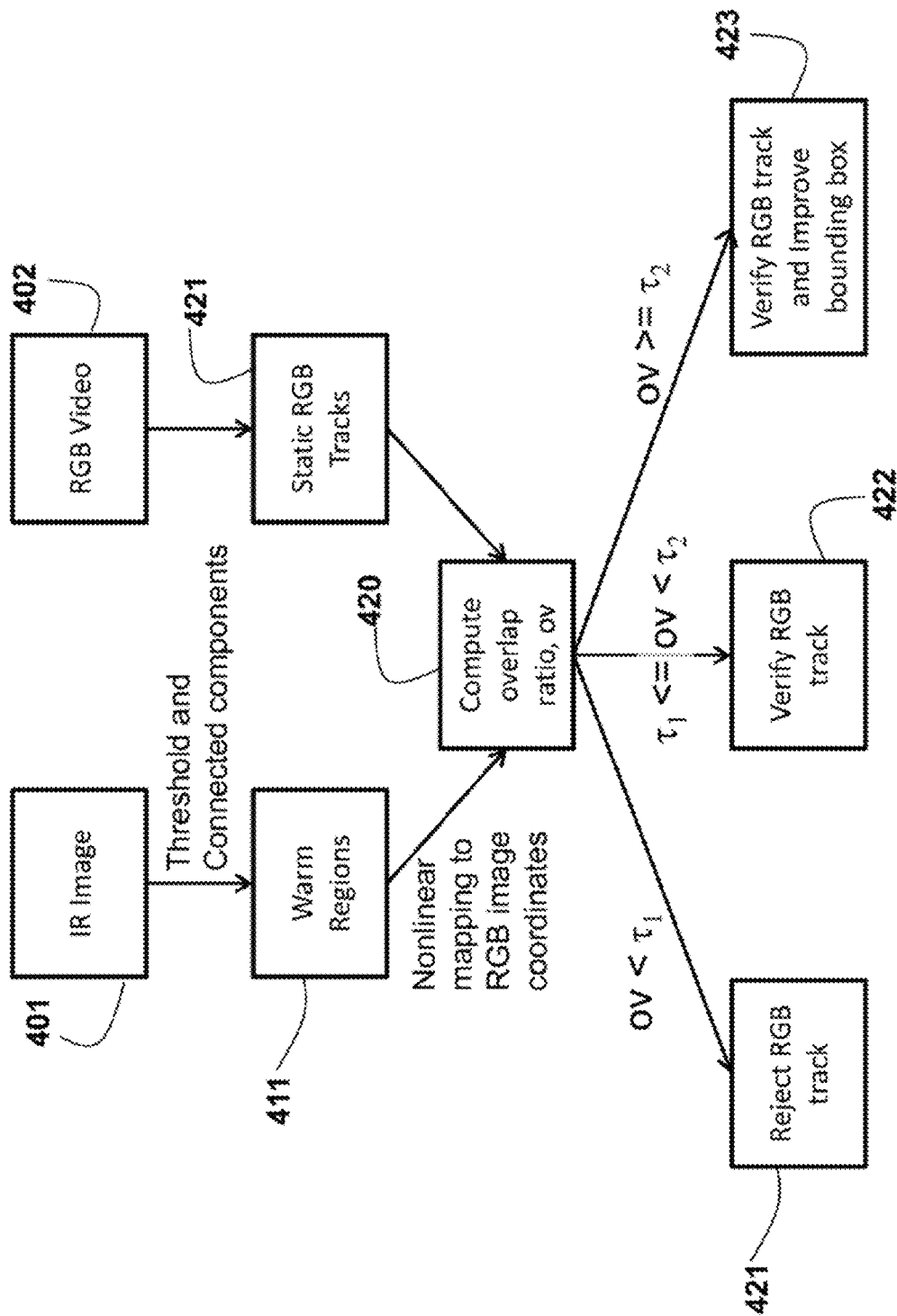
FIG. 4 is a flow diagram of a procedure for determining an amount of overlap between an RGB image and an IR image according to embodiments of the invention.

As shown in FIG. 4, each time a new IR image 401 is obtained from the thermal IR sensor, every static track 421 that is currently present in the RGB video stream 402 is verified using the IR image, by checking whether a warm region 411 is detected at the corresponding location in the IR image. To find warm regions in the IR image, we threshold the pixels of the IR image and find connected regions of pixels that are above threshold.

For each warm region, we find the minimum enclosing bounding box $bb_{ir}^j$ in the IR image. This is mapped to the corresponding bounding box in the RGB image $bb_{rgb}^j$ by the spatial mapping F. To ensure that $bb_{rgb}^j$ is a rectangular bounding box, after transforming the IR bounding box by the spatial mapping F we set $bb_{rgb}^j$ equal to the circumscribing rectangular bounding box of the transformed IR bounding box.

To find which IR region (if any) is associated with each static track 421, we determine 420 for which region, j, in the IR image the corresponding bounding box in the RGB image, $bb_{rgb}^j$, has the largest overlap ratio ov with the track's bounding box $bb_{tr}$. Depending on the amount of overlap using a lower and upper threshold, we can reject 421 the RGB track, verify 422 the RGB track, or verify the RGB track and improve 423 its bounding box.

For each track tr, the corresponding IR region j* from the set of n IR regions in the current IR image is given by:

$$j^* = \arg\max_{j=1,\ldots,n} ov(bb_{tr}, bb_{rgb}^j), \quad (3)$$

where ov is the bounding-box overlap ratio:

$$ov(bb_1, bb_2) = \frac{\text{area}(bb_1 \mid bb_2)}{\text{area}(bb_1 \cup bb_2)}. \quad (4)$$

If the best region j* has $ov(bb_{tr}, bb_{rgb}^{j^*}) < \tau_1$, where $\tau_1$ denotes the first threshold (e.g., $\tau_1 = 0.1$), then we reject 421 track tr.

Better Bounding Boxes

IR information can also be used to obtain better segmentation of tracked people from the background. Because the RGB tracker uses background subtraction, it can have inaccurate bounding boxes due to issues such as some foreground regions having very similar color to the local background, lighting changes, and motion blur. To improve 423 inaccurate track bounding boxes, we replace the bounding box $bb_{tr}$ from the RGB tracker with the transformed bounding box $bb_{rgb}^{j^*}$ of the corresponding IR region if the overlap ratio $ov(bb_{tr}, bb_{rgb}^{j^*})$ is greater than a second threshold $\tau_2$ (e.g., $\tau_2 = 0.3$).

Adding New Tracks

IR information can also be used to generate new tracks. This is particularly necessary in indoor situations in which two or more people enter together such that their foreground regions overlap or touch. Because track boundaries in our RGB tracker come from background subtraction, groups of people who occlude each other when they enter the scene are tracked as a single bounding box. Such situations can commonly arise in indoor environments.

For example, two people enter together and sit on a couch, after which one of the people departs while the second person remains stationary on the couch. The RGB tracker cannot infer that the remaining foreground object is actually a person, because it might be a left-behind object. For instance, the RGB tracker cannot distinguish this situation from one in which a single person carried in a suitcase, sat down, and then departed but left his suitcase in the scene. The remaining person is not moving, and there has been no opportunity to learn an identity descriptor for the person because the person has never been tracked individually.

The signature of such cases is that a track splits into two (or more) parts, and one of the parts is static and does not match any stored identity descriptors. In these cases, our RGB+IR system flags the location of the static part and stores its bounding box. When the next IR image arrives, the system checks whether there is an IR region that intersects (overlaps with) the stored bounding box. If so, then the system concludes that it must be a person and starts a new track at that location. This may seem like an unlikely scenario, but it is actually a fairly common occurrence in living environments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:
1. A method for tracking objects in an environment, comprising:
    acquiring a first sequence of images of the environment with a camera having a first frame rate, wherein the camera is a visible light camera;
    acquiring a second sequence of images of the environment with a sensor having a second frame rate, wherein the sensor is a thermal infrared (IR) sensor, and wherein the second frame rate is substantially lower than the first frame rate;
    tracking objects in the first sequence of images to obtain tracks;
    detecting warm regions in the second sequence of images to obtain detections;
    aligning spatially and temporally the tracks and the detections; and
    verifying whether the tracks and detections coincide after the aligning.
2. The method of claim 1, wherein the sensor includes an array of thermal receivers arranged in a vertical line, and further comprising:
    rotating the array in discrete steps to produce IR images for the second sequence of images.
3. The method of claim 1, wherein the camera and sensor are substantially colocated.
4. The method of claim 1, further comprising:
    controlling equipment according to the tracks and the detections.
5. The method of claim 4, wherein the equipment is a heating ventilation air conditioning (HVAC) system.
6. The method of claim 1, wherein the tracking of the objects uses a background model and a template tracker.
7. The method of claim 1, further comprising:
    deleting any track that does not coincide with a detection.
8. The method of claim 7, further comprising:
    updating a bounding box of a track if the bounding box coincides with a detection so that the bounding box of the track equals a detection bounding box.
9. The method of claim 1, wherein the first frame rate is several frames per second, and the second frame rate is about 1 frame per minute.

10. The method of claim 1, wherein aligning uses a combination of nonlinear mappings and a linear homography mapping.

11. The method of claim 1, wherein foreground objects that are classified as people have associated identity descriptors.

12. The method of claim 11, wherein each of the identity descriptors is a color histogram.

13. The method of claim 11, wherein newly detected static foreground objects that do not match any of the identity descriptors are classified as non-people and are not tracked.

14. The method of claim 11, further comprising:
determining when a track splits into two or more parts wherein one of the parts is a static part and does not match any of the identity descriptors;
storing a bounding box of the static part;
initializing a new track at a location of the bounding box if any of the detections coincide with the bounding box.

15. The method of claim 1, further comprising:
representing a particular track by tr, and a bounding box $bb_{tr}$ in an image i by $$bb_{tr}(i) = [x_{tr}(i) y_{tr}(i) w_{tr}(i) h_{tr}(i)]^T,$$

where (x,y), w, and h respectively represent a center, width, and height of the bounding box, and T is a transpose operator, and a motion of a track tr over the last p images as $$\text{motion}(tr) = \frac{1}{p} \sum_{i=f-p}^{f-1} \|bb_{tr}(i) - bb_{tr}(i+1)\|_1,$$

where $\|\cdot\|_1$ denotes an $L_1$ norm, f is an index of a current image in the first sequence, p is a number of images in the first sequence over which the motion is computed, and wherein all tracks with the motion less than a threshold are classified as static tracks.

16. The method of claim 15, wherein p is half of a ratio of the first frame rate and the second frame rate.

17. The method of claim 1, wherein the warm regions include connected regions of pixels whose values are larger than a predetermined threshold.

18. The method of claim 1, wherein the verifying includes determining an overlap ratio between bounding boxes of the tracks and the detections.

19. The method of claim 18, where, depending on the overlap ratio, tracks are rejected or verified.

20. The method of claim 1, wherein the IR images have a wide field of view.

21. The method of claim 1, wherein the resolution of images in the second sequence is substantially lower than the resolution of images in the first sequence.

22. A system for tracking objects in an environment, comprising:
a camera configured to acquire a first sequence of images of the environment having a first frame rate, wherein the camera is a visible light camera;
a sensor configured to acquire a second sequence of images of the environment having a second frame rate, wherein the sensor is a thermal infrared (IR) sensor, and wherein the second frame rate is substantially lower than the first frame rate;
a processor configured to track objects in the first sequence of images to obtain tracks, and to detect warm regions in the second sequence of images to obtain detections, and to spatially and temporally align the tracks and the detections, and to verify whether the tracks and detections coincide after the aligning.

* * * * *